(12) United States Patent
Charron et al.

(10) Patent No.: US 8,065,881 B2
(45) Date of Patent: Nov. 29, 2011

(54) TRANSITION WITH A LINEAR FLOW PATH WITH EXHAUST MOUTHS FOR USE IN A GAS TURBINE ENGINE

(75) Inventors: Richard Charron, West Palm Beach, FL (US); Gary Snyder, Jupiter, FL (US)

(73) Assignee: Siemens Energy, Inc., Orlando, FL (US)

( * ) Notice: Subject to any disclaimer, the term of this patent is extended or adjusted under 35 U.S.C. 154(b) by 763 days.

(21) Appl. No.: 12/190,060

(22) Filed: Aug. 12, 2008

(65) Prior Publication Data

US 2010/0037617 A1 Feb. 18, 2010

(51) Int. Cl.
F02C 1/00 (2006.01)

(52) U.S. Cl. ............... 60/752; 60/754; 60/804; 60/805; 60/39.37; 415/182.1; 431/351

(58) Field of Classification Search ............... 415/182.1, 415/351; 60/39.37, 752, 753, 754, 804, 805
See application file for complete search history.

(56) References Cited

U.S. PATENT DOCUMENTS

| | | | |
|---|---|---|---|
| 2,596,646 A | 5/1952 | Buchi | |
| 2,967,013 A | 1/1961 | Dallenbach et al. | |
| 3,184,152 A | 5/1965 | Bourquard | |
| 3,333,762 A | 8/1967 | Vrana | |
| 3,420,435 A | 1/1969 | Jarosz et al. | |
| 3,484,039 A | 12/1969 | Mittelstaedt | |
| 3,657,882 A | 4/1972 | Hugoson | |
| 3,743,436 A | 7/1973 | O'Connor | |
| 3,759,038 A | 9/1973 | Scalzo et al. | |
| 4,164,845 A | 8/1979 | Exley et al. | |
| 4,368,005 A | 1/1983 | Exley et al. | |
| 4,565,505 A | 1/1986 | Woollenweber | |
| 5,039,317 A | 8/1991 | Thompson et al. | |
| 5,145,317 A | 9/1992 | Brasz | |
| 5,320,489 A | 6/1994 | McKenna | |
| 6,280,139 B1 | 8/2001 | Romani et al. | |
| 6,589,015 B1 | 7/2003 | Roberts et al. | |
| 6,845,621 B2 | 1/2005 | Teets | |
| 2006/0127827 A1 | 6/2006 | Yoshida et al. | |
| 2007/0017225 A1* | 1/2007 | Bancalari et al. | ............... 60/752 |

FOREIGN PATENT DOCUMENTS

EP 1903184 A2 3/2008
* cited by examiner

*Primary Examiner* — Ehud Gartenberg
*Assistant Examiner* — Steven Sutherland (57) ABSTRACT

A transition duct for routing a gas flow from a combustor to the first stage of a turbine section in a combustion turbine engine is disclosed. The transition duct may have an internal passage extending between an inlet to an outlet. An axis of the transition duct body may be generally linear such that gases expelled from the transition duct body flow in a proper direction into the downstream turbine blades. The linear transition duct may include an outlet with exhaust mouths that are configured such that sides of the transition duct are coplanar with adjacent transition ducts, thereby eliminating destructive turbulence between adjacent, linear transition ducts.

18 Claims, 9 Drawing Sheets

TRANSITION WITH A LINEAR FLOW PATH WITH EXHAUST MOUTHS FOR USE IN A GAS TURBINE ENGINE

FIELD OF THE INVENTION

This invention is directed generally to gas turbine engines, and more particularly to transition ducts for routing gas flow from combustors to the turbine section of gas turbine engines.

BACKGROUND OF THE INVENTION

Figure 1:
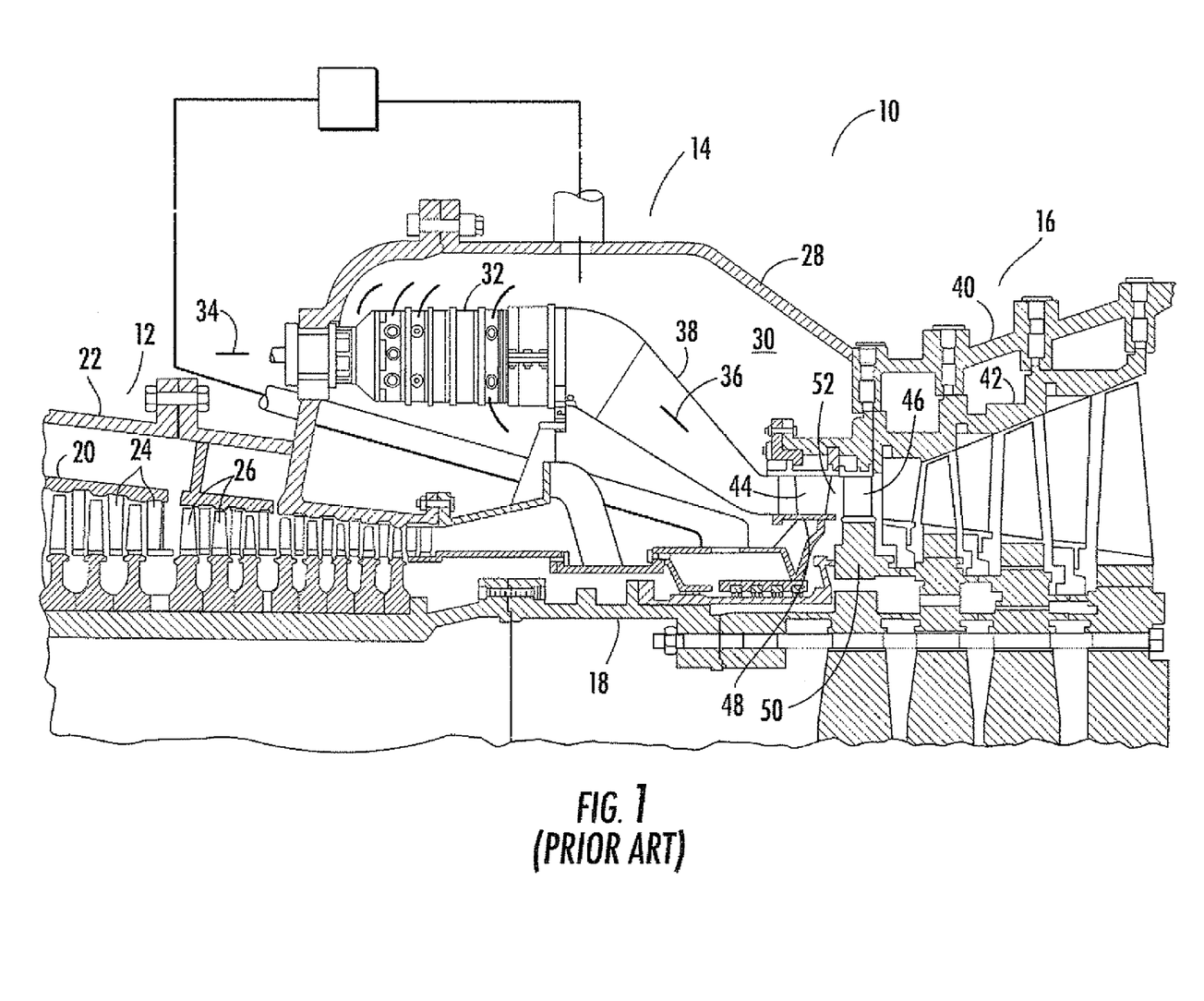
FIG. 1 is a cross-sectional view of a portion of a prior turbine engine.

Referring to FIG. 1, there is shown a cross-section through a portion of a combustion turbine 10. The major components of the turbine are a compressor section 12, a combustion section 14 and a turbine section 16. A rotor assembly 18 is centrally located and extends through the three sections. The compressor section 12 can include cylinders 20, 22 that enclose alternating rows of stationary vanes 24 and rotating blades 26. The stationary vanes 24 can be affixed to the cylinder 20 while the rotating blades 26 can be mounted to the rotor assembly 18 for rotation with the rotor assembly 18.

The combustion section 14 can include a shell 28 that forms a chamber 30. Multiple combustors, for example, sixteen combustors (only one combustor 32 of which is shown) can be contained within the combustion section chamber 30 and distributed around a circle in an annular pattern. Fuel 34, which may be in liquid or gaseous form—such as oil or gas—can enter each combustor 32 and be combined with compressed air introduced into the combustor 32 from the chamber 30, as indicated by the unnumbered arrows surrounding the combustor 32. The combined fuel/air mixture can be burned in the combustor 32 and the resulting hot, compressed gas flow 36 can be exhausted to a transition duct 38 attached to the combustor 32 for routing to the turbine section 16.

The turbine section 16 can include a cylindrical housing 40, including an inner cylinder 42, can enclose rows of stationary vanes and rotating blades, including vanes 44 and blades 46. The stationary vanes 44 can be affixed to the inner cylinder 42 and the rotating blades 46 can be affixed to discs that form parts of the rotor assembly 18 in the region of the turbine section 16. The first row of vanes 44 and the first row of blades 46 near the entry of the turbine section 16 are generally referred to as the first stage vanes and the first stage blades, respectively.

Encircling the rotor assembly 18 in the turbine section 16 can be a series of vane platforms 48, which together with rotor discs 50, collectively define an inner boundary for a gas flow path 52 through the first stage of the turbine section 16. Each transition duct 38 in the combustion section 14 can be mounted to the turbine section housing 40 and the vane platforms 48 to discharge the gas flow 30 towards the first stage vanes 44 and first stage blades 46.

In operation, the compressor section 12 receives air through an intake (not shown) and compresses it. The compressed air enters the chamber 30 in the combustion section 14 and is distributed to each of the combustors 32. In each combustor 32, the fuel 34 and compressed air is mixed and burned. The hot, compressed gas flow 30 is then routed through the transition duct 38 to the turbine section 16. In the turbine section 16, the hot, compressed gas flow is turned by the vanes, such as first stage vane 44, and rotates the blades, such as first stage blade 62, which in turn drive the rotor assembly 18. The gas flow is then exhausted from the turbine section 16. The turbine system 10 can include additional exhaust structure (not shown) downstream of the turbine section 16. The power thus imparted to the rotor assembly 18 can be used not only to rotate the compressor section blades 26 but also to additionally rotate other machinery, such as an external electric generator or a fan for aircraft propulsion (not shown).

For a better understanding of the invention, a coordinate system can be applied to such as turbine system to assist in the description of the relative location of components in the system and movement within the system. The axis of rotation of the rotor assembly 18 extends longitudinally through the compressor section 12, the combustion section 14 and the turbine section 16 and defines a longitudinal direction. Viewed from the perspective of the general operational flow pattern through the various sections, the turbine components can be described as being located longitudinally upstream or downstream relative to each other. For example, the compressor section 12 is longitudinally upstream of the combustion section 14 and the turbine section 16 is longitudinally downstream of the combustion section 14. The location of the various components away from the central rotor axis or other longitudinal axis can be described in a radial direction. Thus, for example, the blade 46 extends in a radial direction, or radially, from the rotor disc 50. Locations further away from a longitudinal axis, such as the central rotor axis, can be described as radially outward or outboard compared to closer locations that are radially inward or inboard.

The third coordinate direction—a circumferential direction—can describe the location of a particular component with reference to an imaginary circle around a longitudinal axis, such as the central axis of the rotor assembly 18. For example, looking longitudinally downstream at an array of turbine blades in a turbine engine, one would see each of the blades extending radially outwardly in several radial directions like hands on a clock. The "clock" position—also referred to as the angular position—of each blade describes its location in the circumferential direction. Thus, a blade in this example extending vertically from the rotor disc can be described as being located at the "12 o'clock" position in the circumferential direction while a blade extending to the right from the rotor disc can be described as being located at the "3 o'clock" position in the circumferential direction, and these two blades can be described as being spaced apart in the circumferential direction. Thus, the radial direction can describe the size of the reference circle and the circumferential direction can describe the angular location on the reference circle.

Generally, the longitudinal direction, the radial direction and the circumferential direction are orthogonal to each other. Also, direction does not connote positive or negative. For example, the longitudinal direction can be both upstream and downstream and need not coincide with the central axis of the rotor. The radial direction can be inward and outward, and is not limited to describing circular objects or arrays. The circumferential direction can be clockwise and counter-clockwise, and, like the radial direction, need not be limited to describing circular objects or arrays.

Further, depending on the context, the relevant position of two components relative to each other can be described with reference to just one of the coordinate directions. For example, the combustor 32 can be described as radially outboard of the blade 46 because the combustor 32 is located radially further away from the central axis of the rotor assembly 18 than the blade 46 is—even though the combustor 32 is not in the same longitudinal plane of the blade 44, and in fact, is longitudinally upstream of the blade 44 and may not be circumferentially aligned with a particular blade.

The coordinate system can also be referenced to describe movement. For example, gas flow 36 in the transition 38 is shown to flow in the direction of arrow 36. This gas flow 36 travels both longitudinally downstream from the combustor 32 to the turbine section 16 and radially inward from the combustor 32 to the first stage vanes 44 and blades 46.

In the context of describing movement, such as the flow of a gas, the circumferential direction can also be referred to as the tangential direction. When gas flows in the circumferential direction, a component of the flow direction is tangential to a point on the circular path. At any given point on the circle path, the circumferential flow can have a relatively larger tangential component and a relatively smaller radial component. Since the tangential component predominates, particularly for larger diameter paths, such as around vane and blade arrays in a turbine engine, a circumferential direction and tangential direction can be regarded as substantially the same.

Figure 2:
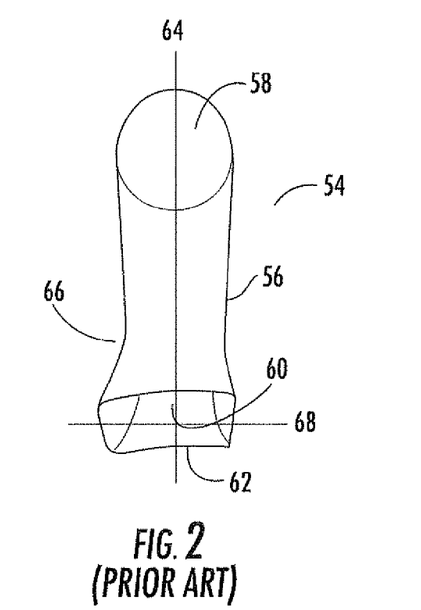
FIG. 2 is an upstream longitudinal view of a prior transition duct.

Bearing this coordinate system in mind and referring to FIG. 2, a transition duct 54 is shown alone as it would be seen when viewed from longitudinally downstream. This particular transition duct 54 is oriented in the 12 o'clock circumferential position and it should be understood that a turbine engine would have additional transition ducts, for example, a total of sixteen, spaced in an annular array.

The transition duct 54 can include a transition duct body 56 having an inlet 58 for receiving a gas flow exhausted by an associated combustor (not shown, but see FIG. 1). The transition duct body 56 can include an internal passage 60 from the inlet 58 to an outlet 62 from which the gas flow is discharged towards the turbine section (not shown). Because the combustor is radially outboard of the first stage of the turbine section (see FIG. 1), the transition duct 54 extends radially inwardly from its inlet 58 to its outlet 62. In FIG. 2, this radial direction is depicted by the axis 64. The transition duct 54 includes a longitudinal bend 66 near the outlet 62 to discharge the gas flow predominantly longitudinally. Because the gas flow in the transition duct 54 is redirected radially inwardly and then longitudinally, the transition duct 54 experiences substantial turning in the radial direction 64. This radial thrust pushes the outlet region of the transition duct 54 radially outwardly (up in the plane of the page of the figure). To support the transition duct 54 against this bending thrust, the transition duct 54 can be radially supported by various braces (not shown) at its ends, as it well known in the art. It can be seen that the outlet 62 and the inlet 58 are aligned along the circumferential or tangential direction, which is depicted by the axis 68.

Figure 3:
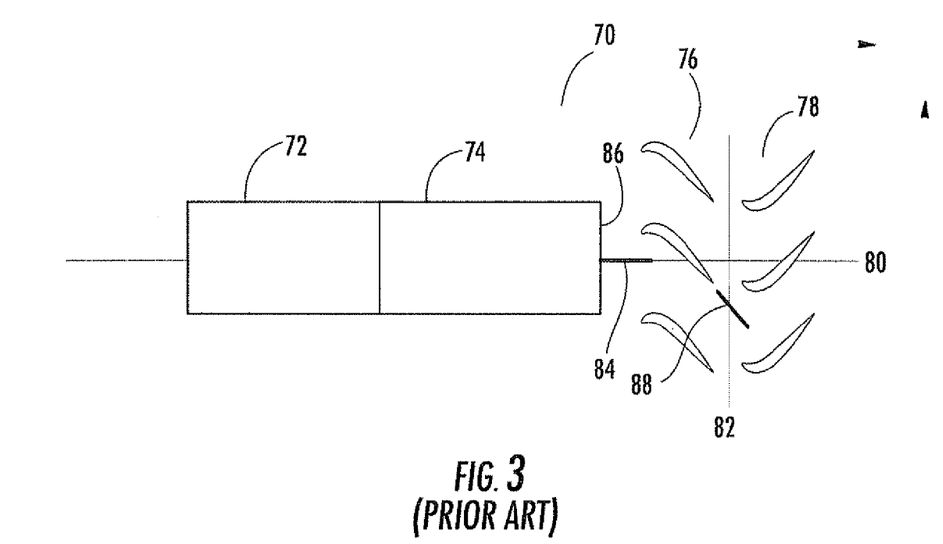
FIG. 3 is a schematic radial view of a combustor, transition duct and first stage vanes and blades of a prior turbine engine.

Reference is now made to FIG. 3, focusing on a turbine subsection 70 that includes a combustor 72, a transition duct 74 and first stage vanes 76 and blades 78. FIG. 3 shows a view from above of the combustor 72, the transition duct 74, a few first stage vanes 76 and a few first stage blades 78, illustrated schematically. It should be understood that in a turbine, there would be additional first stage vanes spaced apart circumferentially to form an annular array. Similarly, there would be additional first stage blades spaced apart circumferentially to form an annular array around the engine centerline. These additional vanes and blades are not shown in FIG. 3 to facilitate illustration. A turbine system would typically also include additional combustors and transitions, but a single combustor 72 and transition 74 are shown schematically for purposes of illustration.

From this top view, the longitudinal direction can be noted by reference to the axis 80. The circumferential or tangential direction can be noted by reference to the axis 82. The radial direction is not illustrated because the radial direction lies into and out of the page of the figure, but would be generally orthogonal to the longitudinal direction and the radial direction.

Gas flow, such as hot, compressed gas with perhaps some limited liquid content, is exhausted from the combustor 72 and routed by the transition duct 74 to the first stage vanes 76 and blades 78. The gas flow as discharged from the exit or outlet 86 of the transition duct 74 generally travels downstream in the longitudinal direction, as indicated by the arrow 84. There may be some incidental, small-scale radial and circumferential flow components to the discharged gas flow that produce a downstream wake due to edge conditions 86 at the outlet and other factors. The downstream wake can create vibrations in downstream turbine blades.

As this longitudinal gas flow 84 discharges from the outlet 86 of the transition duct 74, the flow passes the first stage vanes 76. The function of the first stage vanes 76 is to accelerate and turn the predominantly longitudinal flow in the circumferential direction 82 so that the predominant flow direction of the gas flow leaving the trailing edges of vanes 76 is angled in the circumferential or tangential direction relative to the longitudinal direction as shown, for example, by the arrow 88. This turned flow 88 thus has a longitudinal component and a circumferential component. The flow angle can be substantial, in the range of 40 degrees to 85 degrees measured from the longitudinal axis 80. By accelerating and angling the gas flow in the circumferential direction 82 relative to the longitudinal direction 80, the resulting gas flow 88 more effectively imparts its energy to the first row blades 787 which in turn rotate the associated rotor assembly (not shown).

The use of first stage vanes to accelerate and turn the longitudinal gas flow in the circumferential direction present several challenges. The vanes and the associated vane support structure (see FIG. 1) must have high strength characteristics to withstand the forces generated in changing the direction of a extremely hot, high pressure gas flow over a substantial angle in a relatively short distance. The temperature of the gas flow and the heat generated by this turning process also require a vane cooling system. The forces and heat involved diminish material properties that can crack and otherwise damage the vanes and associated support structure. To address these various requirements and operating conditions, the first stage vanes and the associated support structure and cooling systems have developed into a complex system that can be expensive to manufacture, install, and, in the event of damage, repair and replace. Thus, there is a need to accelerate and tangentially turn a gas flow for presentation to a first stage blade array without the complications and related costs and damage risks associated with first stage vanes.

SUMMARY OF THE INVENTION

This invention is directed to a transition duct for routing gas flow from a combustor to a turbine section of a turbine engine and eliminating damaging stresses created between conventional transitions and row one turbine vanes. The transition duct may have an axis that is generally linear with a generally linear flow path that combines the functions of a transition and row one turbine vanes. In such a configuration, the transition duct channels gases from a combustor basket to a downstream turbine blade assembly and accomplishes the task of redirecting the gases, thereby eliminating the need for row one vanes. The transition duct directs gases into the turbine assembly at the same incidence angle relative to the longitudinal axis of the engine and does not include any leading or trailing edges, and the problems inherent with each, that are found in each of the row one vanes. The transition ducts are constructed such that adjacent sides of adjacent ducts are coplanar, which causes the gases to be emitted from each of the transition ducts without an area of decreased fluid flow between adjacent flows. In at least one embodiment of the transition duct, there is no turning of the gases, in particular, no radial or circumferential turning of the gases. As a result, there is not a circumferential pressure gradient across the outlet, thereby resulting in reduced excitation and stresses on the row one blades. The nonexistence of gas turning also reduces structural loading on mounts and eliminates aerodynamic losses due to turning of the gas flow. Finally, because there is no uncovered turning, a more uniform flow angle is created over the range of operating conditions.

The transition duct may be configured to route gas flow in a combustion turbine subsystem that includes a first stage blade array having a plurality of blades extending in a radial direction from a rotor assembly for rotation in a circumferential direction, said circumferential direction having a tangential direction component, the rotor assembly axis defining a longitudinal direction, and at least one combustor located longitudinally upstream of the first stage blade array and located radially outboard of the first stage blade array. The transition duct may be formed from a transition duct body having an internal passage extending between an inlet and an outlet. The outlet may be offset from the inlet in the longitudinal direction. An axis of the transition duct body may be generally linear such that a flow path for gases is generally linear.

In at least one embodiment, the inlet may be generally cylindrical and an adjacent midsection of the duct may be generally conically shaped. A throat adjacent to the midsection may have a cross-section with a generally consistent cross-sectional area. The inlet may be generally cylindrical and an adjacent midsection of the duct may be generally conically shaped. A throat may be positioned adjacent to the midsection and may have a cross-section with a generally consistent cross-sectional area.

The outlet may be formed from a radially outer side generally opposite to a radially inner side, and the radially outer and inner sides may be coupled together with opposed first and second side walls. The radially inner side may be positioned radially outward a distance equivalent to the position of the ID of adjacent turbine blades, and the radially outer side may be positioned radially outward a distance equivalent to the position of the OD of adjacent turbine blades.

In some embodiments, the transition duct body may be generally linear and positioned within a turbine engine such that row one vanes are unnecessary. In particular, the outlet may be offset from the inlet in the tangential direction and positioned such that gases are discharged from the outlet at an angle between the longitudinal direction and the tangential direction when the transition duct body is located between the combustor and the first stage blade array to receive the gas flow from the combustor into the internal passage through the inlet and to discharge the gas flow toward the first stage blade array.

The transition duct may include a first exhaust mouth positioned in a sidewall and extending from a downstream end of the transition duct body toward the throat, wherein a bottom edge of the first exhaust mouth may be substantially coplanar with an inner surface of a first sidewall forming the transition duct body. The transition duct may also include a second exhaust mouth positioned in the second sidewall forming the first transition duct and extending from the downstream end of the transition duct body toward the throat, wherein an upper edge of the second exhaust mouth is substantially coplanar with an inner surface of the second sidewall forming the transition duct body.

The transition duct may include an attachment system for securing the transition duct to adjacent transition ducts and to the turbine engine. The attachment system may include sealing flanges proximate to each of the first and second exhaust mouths. The attachment system may include any appropriate connectors for releasably attaching the transition ducts together and to the turbine engine.

During operation, hot combustor gases flow from a combustor into inlets of the transitions. The gases are directed through the internal passages. The position of the transition duct is such that gases are directed through the inlet, into the conical midsection where the flow is accelerated, through the adjacent throat and are expelled out of the outlet. The gases are expelled at a proper orientation relative to the turbine blades such that the gases are directed into the turbine blades in correct orientation without need of row one turbine vanes to alter the flow of the gases. Thus, energy is not lost through use of row one turbine vanes. In transition ducts with linear flow paths, the gases are exhausted through the outlets.

An advantage of this invention is that the transition ducts have generally linear axes that enable gases to be emitted from the ducts in proper alignment relative to the row one turbine blades, thereby eliminating the necessity of row one turbine vanes and the inefficiencies associated with the row one turbine vanes.

Another advantage of this invention is that the transition duct eliminates leakages that exist between conventional transitions and turbine vanes because such connection does not exist.

Yet another advantage of this invention is that the transition duct eliminates leakage between adjacent turbine vanes at the exit frame because the transition duct eliminates the need for row one turbine vanes.

Another advantage of this invention is that the incidence angle at which the transition duct is positioned eliminates uncovered turning of gases exiting the transition, thereby making the flow more stable through the range of operating power levels and enabling more power to be extracted from the first stages of the turbine.

Still another advantage of this invention is that the configuration of the transition duct enables a higher incidence angle to be used compared with conventional ducts, which results in increased efficiency because row one turbine vanes are not needed or used and therefore, the inefficiencies caused by the row one turbine blades are not found with use of the transition duct.

Another advantage of this invention is the uniform circumferential pressure gradient of the transition reduce affects on downstream turbine blades caused by pressure gradients developed in the transition. The transition eliminates the abrupt pressure changes of radially aligned transition sides of other transition designs. Eliminating the abrupt pressure changes eliminates the vibrations created by these changes on the turbine blades as the blades rotate about the rotational axis and encounter sixteen such pressure changes upon each revolution.

Yet another advantage of this invention is that the transition eliminates the need for row one turbine vanes and thus eliminates the leading and trailing edges, and the associated problems, including the difficulties of cooling the leading and trailing edges, and the gas blockage caused by the existence of the row one turbine vanes.

Another advantage of this invention is that in an assembly of transition ducts in which the transition ducts are positioned adjacent one another and extend radially outward around a centerline of a turbine engine, the flow paths of the transition ducts are parallel downstream of throats within each duct and offset such that the flow from each transition duct is tangential to a circular configuration of transitions.

Still another advantage of this invention is that the exhaust mouths enable gas flows exhausted from adjacent turbine ducts to flow parallel thereby eliminating non-uniform flow pattern to the row one turbine blades.

Another advantage of this invention is that the attachment system geometry enables a single transition duct to be removed from an array of transition ducts without being required to remove adjacent transition ducts.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF EMBODIMENTS OF THE INVENTION

As shown in FIG. 4-12, this invention is directed to a transition duct 94 for routing gas flow from a combustor to a turbine section of a turbine engine. The transition duct 94 may be have an axis 130 that is generally linear. In such a configuration, the transition duct 94 channels gases from a combustor basket to a downstream turbine blade assembly and accomplishes the task of directing the gases, which has normally been accomplished with row one vanes. Thus, the transition duct 94 eliminates the need for row one vanes. The transition duct 94 may also be configured to include an outlet 100 with side surfaces 112, 114 that is configured to reduce downstream wake thereby resulting in reduced vibration in downstream turbine vanes. As such, the outlet 100 reduces inefficiencies caused by the combustor gases exiting the transition duct 94.

Figure 4:
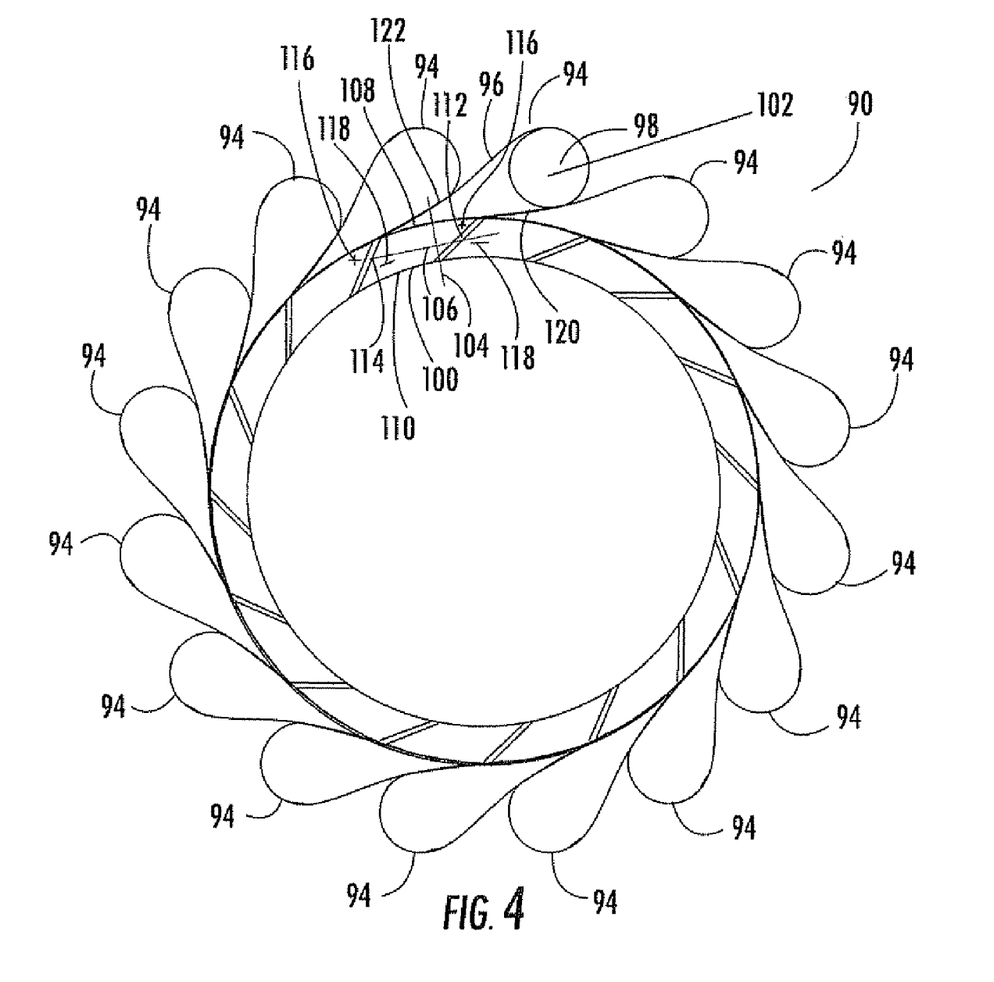
FIG. 4 is a longitudinal upstream view of a circular array of transition ducts embodying aspects of the invention.
Figure 5:
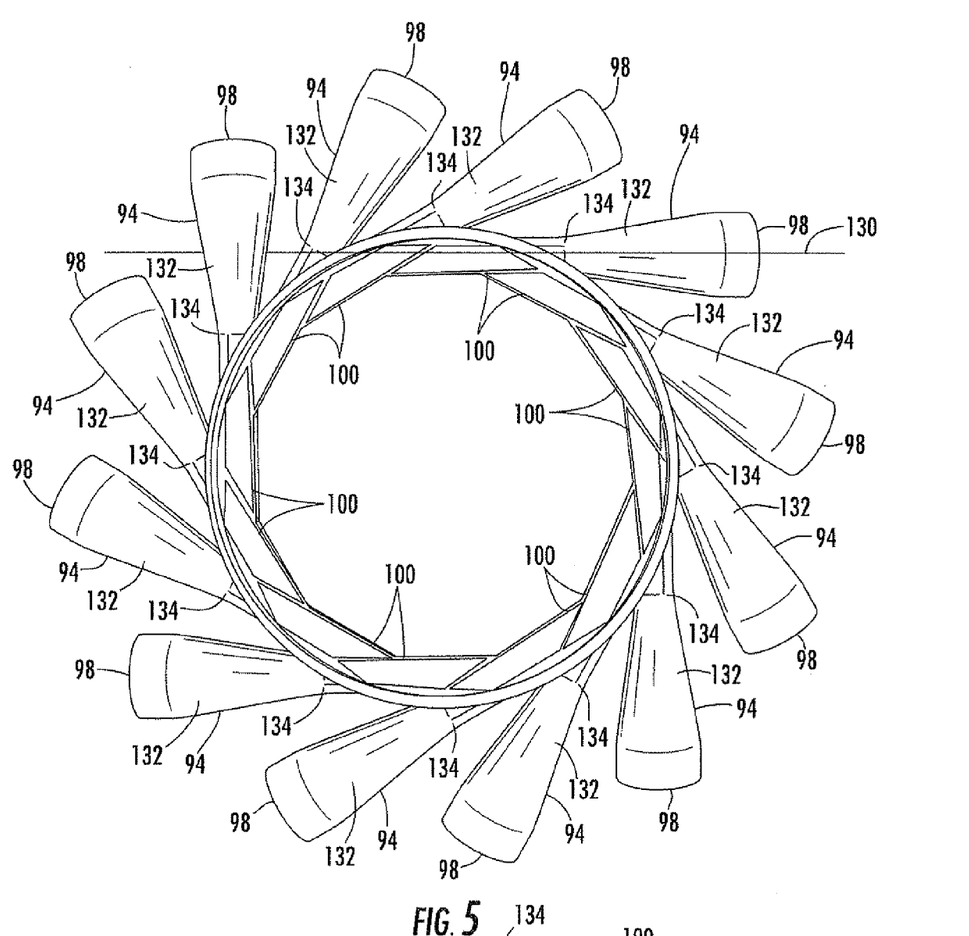
FIG. 5 is a upstream longitudinal view of a circular array of transition ducts embodying aspects of the invention.
Figure 7:
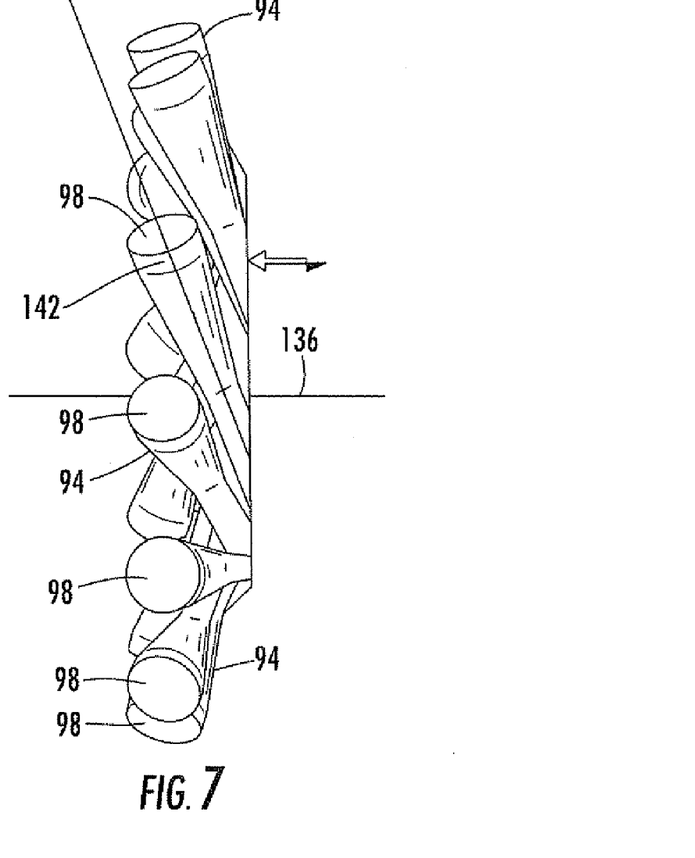
FIG. 7 is a top view of a circular array of transition ducts.

As shown in FIGS. 4, 5 and 7, the transition ducts 94 may be positioned in an annular array 90, as shown without surrounding turbine components in an elevation as viewed from longitudinally downstream in a turbine. Each transition duct 94 can include a transition body 96 having an inlet 98 and an outlet 100 and an internal passage 102 between the inlet 98 and the outlet 100 for routing a gas flow through the transition duct 92 from the inlet 98 to the outlet 100. The array 90 is shown illustrating an arrangement for use in a combustion turbine engine having 16 combustors (not shown). However, the number of transition ducts 94 and their annular arrangement can be varied for use with more or less combustors.

Figure 6:
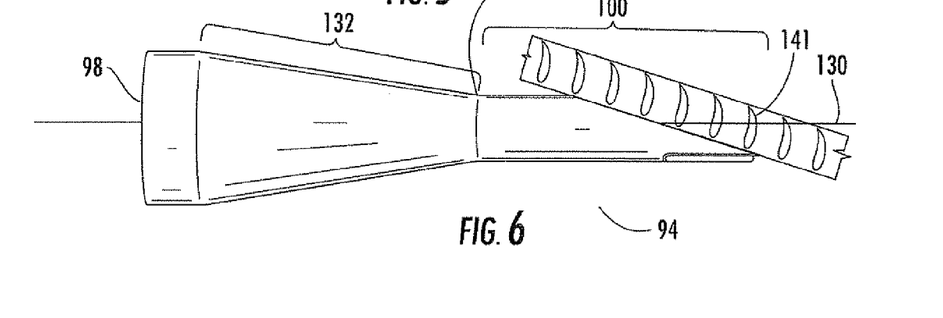
FIG. 6 is a side view of a transition duct.

As shown in FIG. 4-6, the transition duct 94 may include an outlet 100 formed from a radially outer side 108 generally opposite to a radially inner side 110 and configured to match the row one blade annulus. The radially outer side 108 may be positioned radially outward a distance equal to the OD of an adjacent row one turbine blade. The radially inner side 110 may be positioned radially outward a distance equal to the ID of an adjacent row one turbine blade. The radially outer and inner sides 108, 110 may be coupled together with opposed first and second side walls 112, 114. The outlet 100 may be offset from the inlet 98 in the longitudinal direction. The term "offset" as used herein and in the claims means that the outlet is spaced from the inlet as measured along the coordinate direction(s) identified. The outlet 100 may also be offset from the inlet 98 in a tangential direction 106, as shown in FIG. 4. The outlet 100 may also be configured such that the outlet 100 is generally orthogonal to a longitudinal axis 136 of the turbine engine such that the transition duct 94 does not interfere with the row one turbine blades, as shown in FIG. 7.

Figure 8:
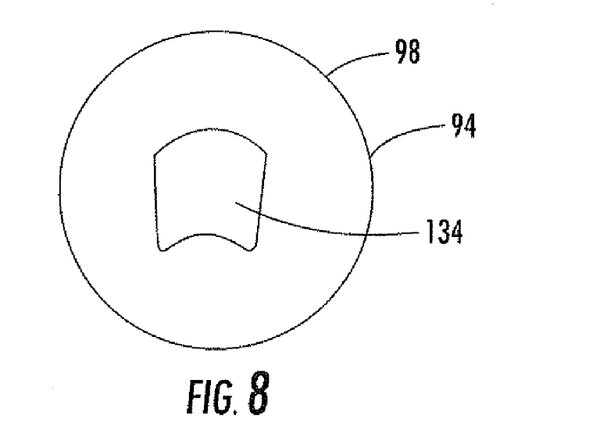
FIG. 8 is an end view of the transition duct of FIG. 6.

The transition duct 94 may be configured to direct gases along a generally linear flow path along the transition axis 130. In one embodiment, the transition duct 94 may have a generally cylindrical inlet 98 adjacent to a conical midsection 132. The conical midsection 132 may include an ever decreasing cross-sectional area until the conical midsection 132 joins an adjacent throat 134. The conical midsection 132 accelerates the flow of gases before the gases are directed into the row one turbine blades 141, as shown in FIG. 6. Accelerating the flow of gases before the gases strike the row one turbine blades increases the efficiency of the turbine engine. The throat 134 may have any appropriate cross-section. In at least one embodiment, the throat 134, as shown in FIG. 8, may have a cross-section with two opposing, generally linear sides and two opposing, non-linear sides. The cross-sectional area of the throat 134 may be less than a cross-sectional area of the conical midsection 132 and less than all other aspects of the transition duct 94.

Figure 9:
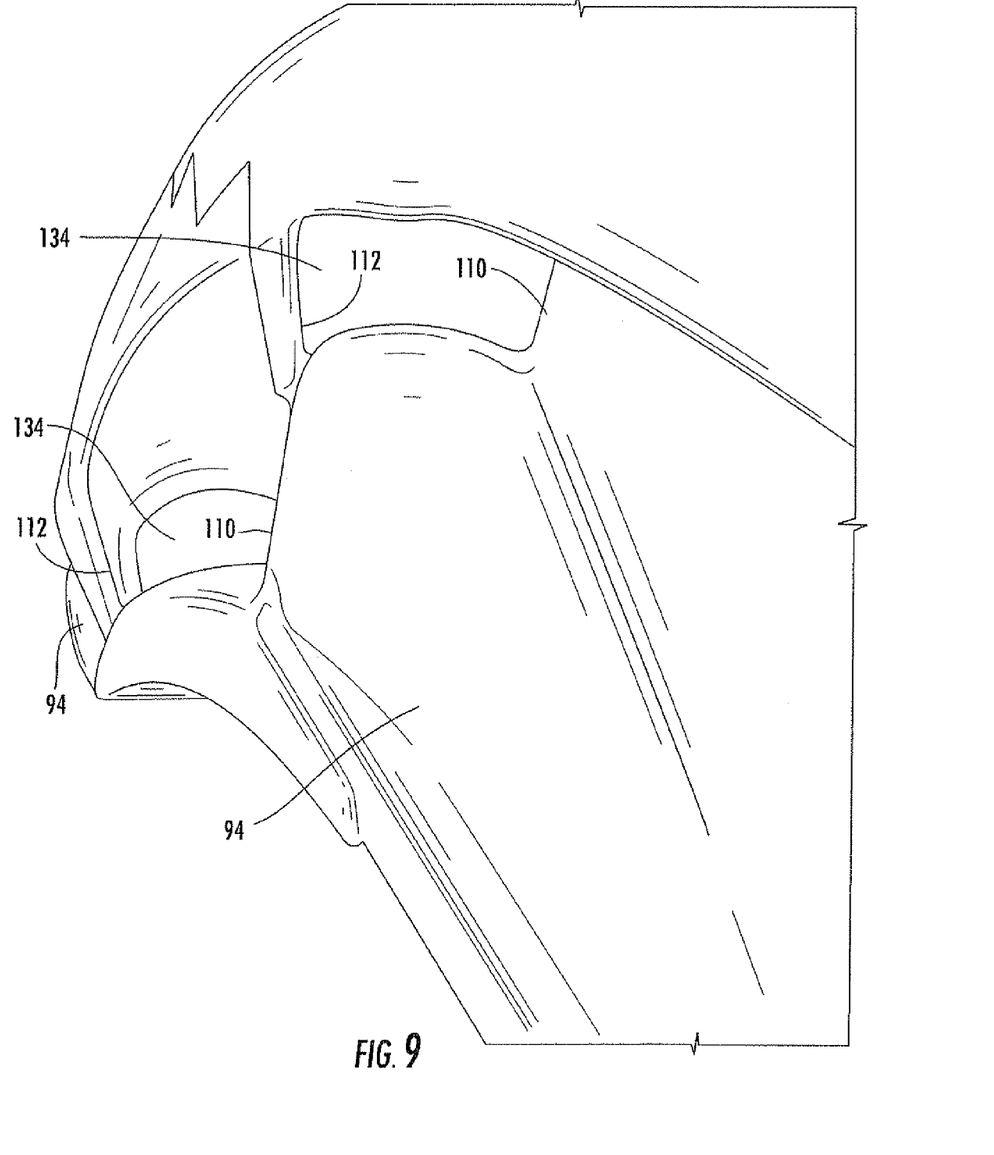
FIG. 9 is a partial perspective view of two transition ducts.

As shown in FIG. 9, the transition ducts 94 may be formed from first and second opposing side walls 112, 114. A first side wall 112 of a first transition duct 94 may be positioned such that an inner surface of the first side wall is coplanar with an inner surface of the second side wall 114 of an adjacent transition duct 94. As such, the gas flows through each transition duct 94 are generally parallel to each other and immediately adjacent to each other without an area of decreased fluid flow between adjacent flows. Instead, the gas flows emitted from each of the transition ducts 94 are parallel and touching each other.

In at least one embodiment, the transition duct 94 may include a first exhaust mouth 140 positioned in the first sidewall 112 and extending from a downstream end 142 of the transition duct body 144 toward the throat 134. The first exhaust mouth 140 may be configured such that gases may be exhausted in a direction that is aligned with adjacent gas flows. A bottom edge 146 of the first exhaust mouth 140 may be substantially coplanar with an inner surface 148 of the first sidewall 112 forming the transition duct body 144. In such a position, gases may be exhausted from the internal passage 102 such that the gases are immediately adjacent to adjacent gas flows from adjacent transition ducts 94, thereby eliminating non-uniform flow pattern to the row one turbine blades.

The bottom edge 146 of the first exhaust mouth 140 may be generally flush with an inner surface 150 forming the bottom of the internal passage 102. An upper edge 152 of the first exhaust mouth 140 may be positioned at an acute angle relative to the bottom edge 146 of the first exhaust mouth 140 such that the bottom edge 146 mates with an edge of a second, adjacent transition duct 154.

The outlet 100 of the transition duct 94 may also be configured such that a second side 114 of the outlet 100 of the first transition duct 84 may be coplanar with a first side 112 of a third transition duct 156 when assembled beside the third transition duct 156 that is generally opposite to the second transition duct 154. In at least one embodiment, the outlet 100 may include a second exhaust mouth 158 positioned in the second sidewall 114 forming the first transition duct 94 and extending from the downstream end 142 of the transition duct body 144 toward the throat 134. An upper edge 160 of the second exhaust mouth 158 may be substantially coplanar with an inner surface 162 of the second sidewall 114 forming the transition duct body 144. In such a position, gases may be exhausted from the internal passage 102 such that the gases are immediately adjacent to adjacent gas flows from adjacent transition ducts 94, thereby eliminating non-uniform flow pattern to the row one turbine blades. In addition, an upper edge 160 of the second exhaust mouth 158 may be generally flush with an inner surface 166 forming the internal passage 102 of the transition duct body 144. A lower edge 168 of the second exhaust mouth 158 may be positioned at an acute angle relative to the upper edge 160 of the second exhaust mouth 158 such that the lower edge 168 mates with a lower, internal surface 170 of the third transition duct 156. In this position, no disruption of the gases flowing from the annular array of transition ducts 94 occurs when moving about the annular array of ducts 94.

Figure 10:
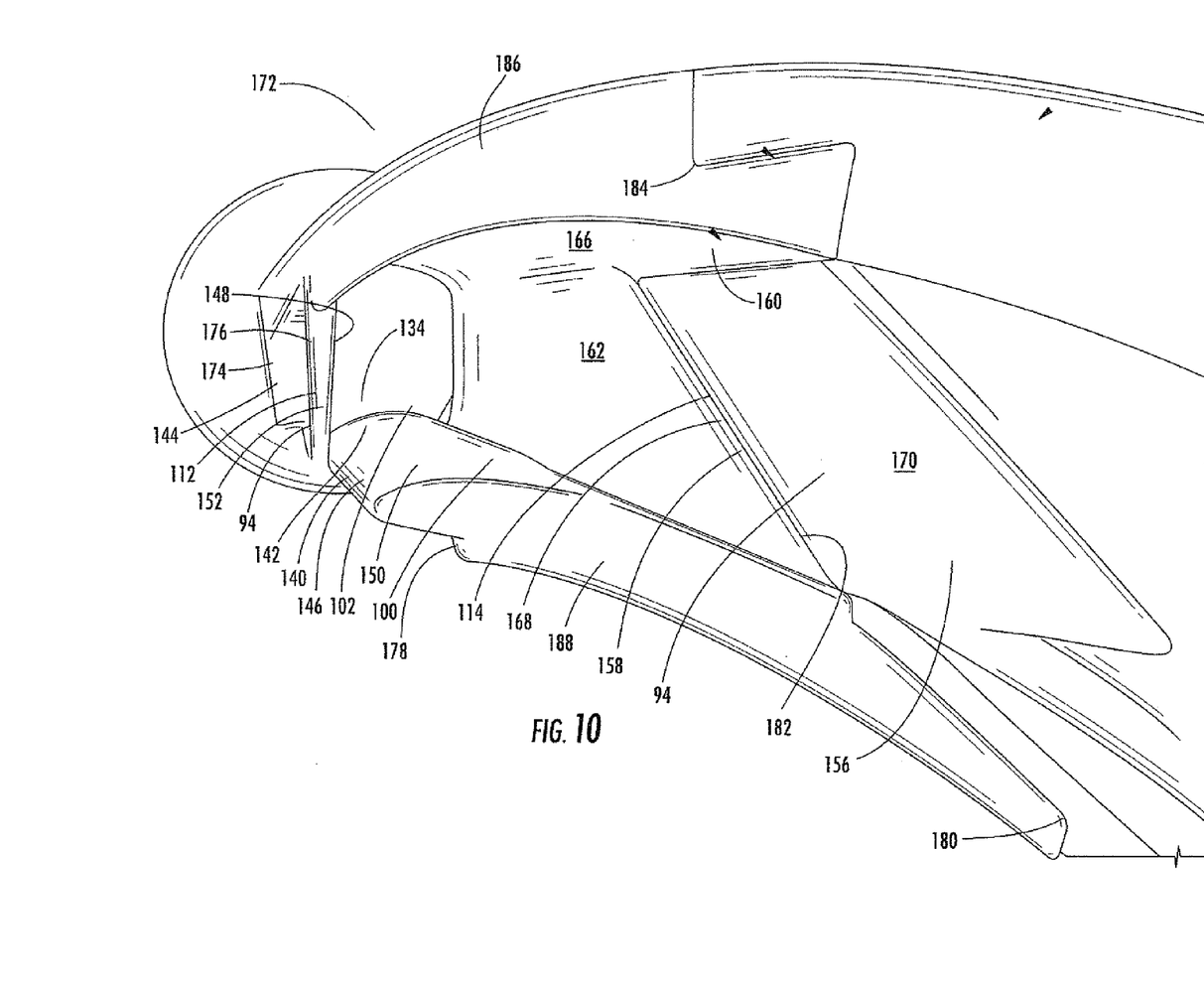
FIG. 10 is a partial perspective view of two transition ducts attached to each other.
Figure 11:
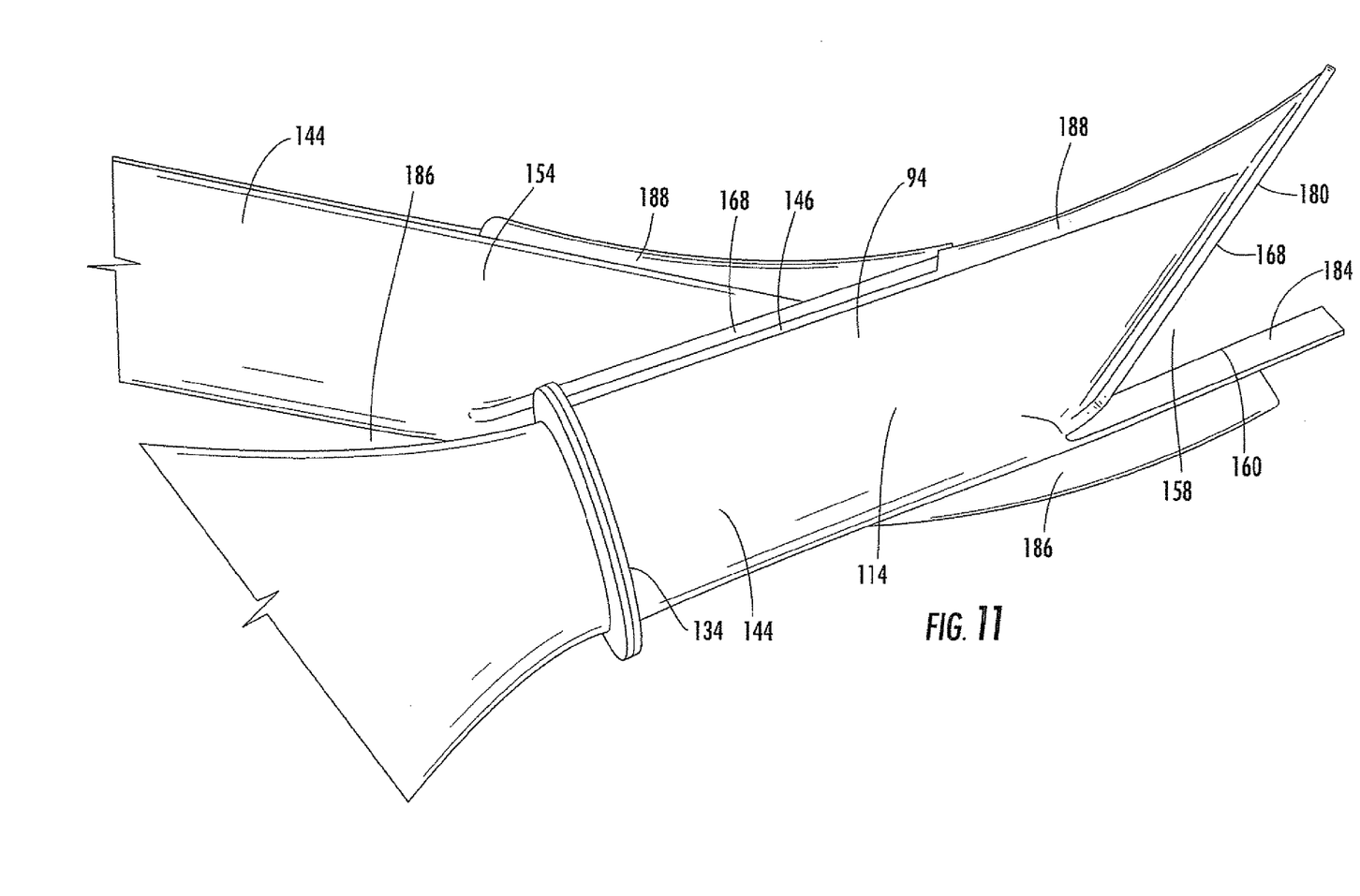
FIG. 11 is a partial perspective view of two transition ducts attached to each other.
Figure 12:
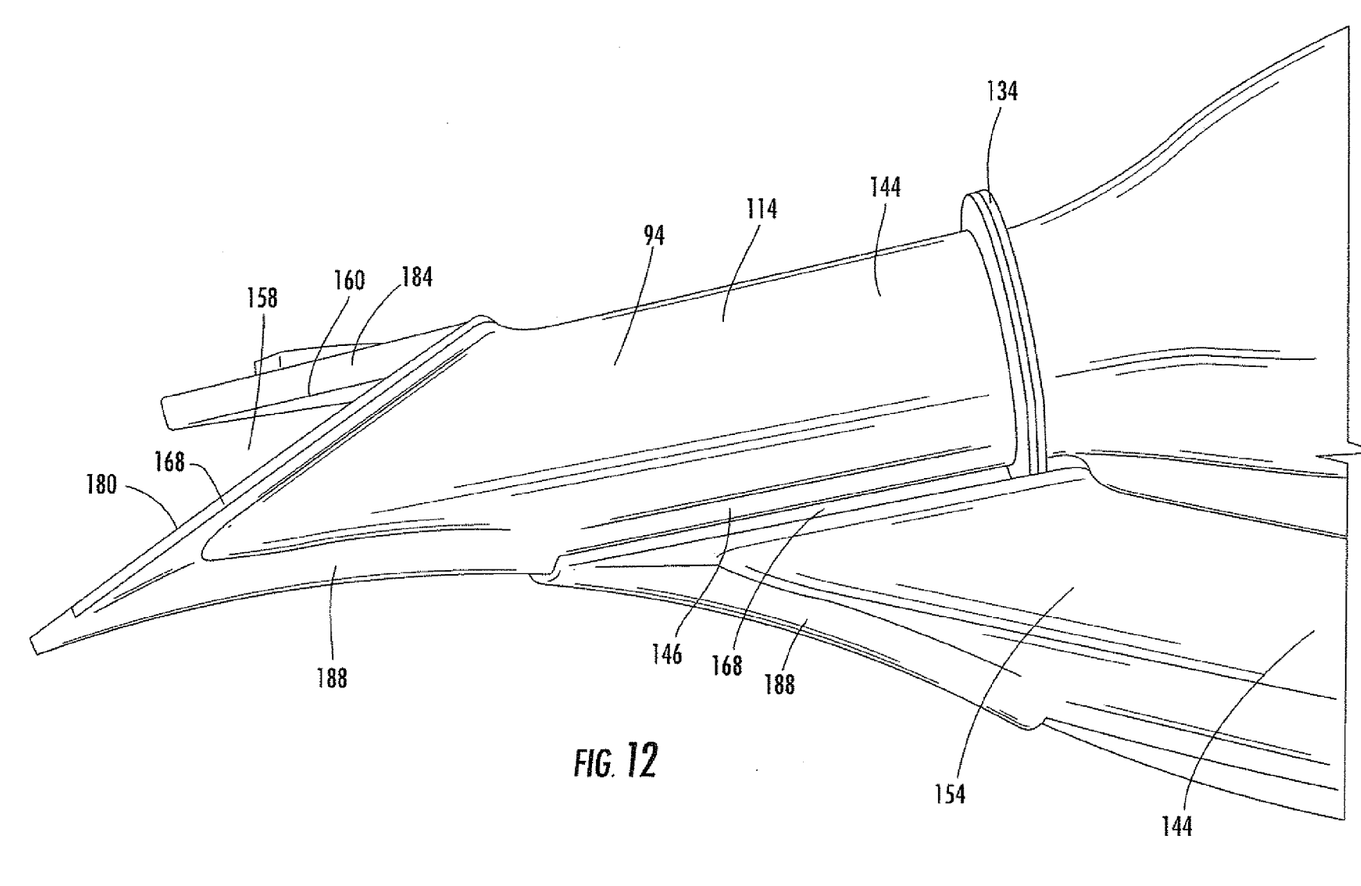
FIG. 12 is a partial perspective view of two transition ducts attached to each other.

The transition ducts 94 may include an attachment system 172 for attaching the transition ducts 94 to each other and to the turbine engine. In at least one embodiment, the transition ducts 94 may include a sealing flange 174 extending outward from an outer surface of the first sidewall 112 and aligned with the upper edge 152 forming the first exhaust mouth 140. The sealing flange 174 may be offset from the first exhaust mouth 140 such that a portion 176 of the outer surface of the first sidewall 112 is exposed between the first exhaust mouth 140 and the sealing flange 174. The transition duct 94 may also include a sealing flange 178 extending outward from a bottom surface 150 of the transition duct body 144 and aligned with a lower edge 146 forming the first exhaust mouth 140. The sealing flanges 174, 178 may formed to mate with sealing flanges extending from adjacent transition ducts. The sealing flanges 174, 178 may be releasably coupled together using devices, such as, but not limited to, mechanical connectors, such as nuts and bolts. The sealing flanges 174, 178 may include holes or be otherwise configured to be incorporated with the sealing flanges 174, 178.

The attachment system 172 may include a sealing flange 180 extending outward from an outer surface of the second sidewall 114 and aligned with a lower edge 168 forming the second exhaust mouth 158. The sealing flange 180 may be offset from the second exhaust mouth 158 such that a portion 182 of the outer surface of the second sidewall 114 is exposed between the second exhaust mouth 158 and the sealing flange 180. The attachment system 172 may also include a sealing flange 184 extending outward from an upper surface 166 of the transition duct body 144 and aligned with an upper edge 160 forming the second exhaust mouth 158. The sealing flanges 180, 184 may formed to mate with sealing flanges extending from adjacent transition ducts. The sealing flanges 180, 184 may be releasably coupled together using devices, such as, but not limited to, mechanical connectors, such as nuts and bolts. The sealing flanges 180, 184 may include holes or be otherwise configured to be incorporated with the sealing flanges 180, 184.

The attachment system 172 may also include a top flange 186 and a bottom flange 188 for securing the transition duct 94 to a turbine engine. The top and bottom flanges 186, 188 may be secured to the turbine engine with releasably devices, such as, but not limited to, mechanical connectors, such as nuts and bolts. When the transition ducts 94 are assembled to form the annular array shown in FIGS. 5 and 7, the top and bottom flanges 186, 188 form annular rings that match the ID and OD of downstream row one turbine blades. Thus, the outlets 100 of the transition ducts 94 are sized to match the downstream row one blades such that the gases exhausted from the outlets 100 are directed to contact the downstream row one turbine blades with no waste. The top and bottom flanges 186, 188 may be positioned at an angle, which is equivalent to the incidence angle 142 of FIG. 7, relative the longitudinal axis 130 of the transition duct. The top and bottom flanges 186, 188 may be positioned generally orthogonal to a longitudinal axis 136 of the turbine engine.

The configuration of the attachment system 172 enables a single transition duct 94 to be removed from the annular array of transition ducts 94 shown in FIGS. 5 and 7 without having to remove additional transition ducts 94. The connectors holding the particular transition duct 94 in place need only be removed to remove the transition duct 94 from the annular array to replace or service the transition duct 94. The transition duct may be removed by sliding the transition duct from the annular array generally along the longitudinal axis of the 130 of the transition duct 94. Such easy removal of the transition duct 94 greatly increases the efficiency of servicing the turbine engine by reducing the time involved with replacing a transition duct 94.

Inclusion of the first and second sides 112, 114 in the outlet 100 facilitates an increased incidence angle 1427 which is the angle shown in FIG. 7 between an axis orthogonal to the longitudinal axis 136 and the linear flow path at the outlet 100 of the transition 94, A higher incidence angle, which is an angle at which the discharge gas flow path is moving further way from alignment with the longitudinal axis 136, facilitates positioning the transition duct 94 at improved angles of discharge of the combustor gases to downstream turbine blades.

During operation, hot combustor gases flow from a combustor into inlets 98 of the transitions 94. The gases are directed through the internal passages 102. The position of the transition duct 94 is such that gases are directed through the inlet 98, the conical midsection 132, and the adjacent throat 134 and are expelled out of the outlet 100. The gases are expelled at a proper orientation relative to the turbine blades such that the gases are directed into the turbine vanes in correct orientation without need of row one turbine vanes to alter the flow of the gases. Thus, energy is not lost through use of row one turbine vanes. In transition ducts 94 with linear flow paths, the gases are exhausted through the outlets 100.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A transition duct for routing gas flow in a combustion turbine subsystem that includes a first stage blade array having a plurality of blades extending in a radial direction from a rotor assembly for rotation in a circumferential direction, said circumferential direction having a tangential direction component, an axis of the rotor assembly defining a longitudinal direction, and at least one combustor located longitudinally upstream of the first stage blade array and located radially outboard of the first stage blade array, said transition duct, comprising:
- a transition duct body having an internal passage extending between an inlet and an outlet;
- a throat having a cross-sectional area that is less than other aspects of the transition duct body;
- wherein the outlet is offset from the inlet in the longitudinal direction;
- wherein an axis of the transition duct body is generally linear; and
- wherein the outlet is configured such that a first side of the outlet of a first transition duct is coplanar with a second side of a second transition duct assembled beside the second transition duct;
- the transition duct further comprising a first exhaust mouth positioned in a sidewall and extending from a downstream end of the transition duct body toward the throat, wherein a bottom edge of the first exhaust mouth is substantially coplanar with an inner surface of a first sidewall forming the transition duct body.

2. The transition duct of claim 1, further comprising a sealing flange extending outward from an outer surface of the first sidewall and aligned with an upper edge forming the first exhaust mouth.

3. The transition duct of claim 2, wherein the sealing flange is offset from the first exhaust mouth such that a portion of the outer surface of the first sidewall is exposed between the first exhaust mouth and the sealing flange.

4. The transition duct of claim 1, further comprising a sealing flange extending outward from a bottom surface of the transition duct body and aligned with a lower edge forming the first exhaust mouth.

5. The transition duct of claim 1, wherein the outlet is configured such that a second side of the outlet of the first transition duct is coplanar with a first side of a third transition duct assembled beside the third transition duct that is generally opposite to the second transition duct.

6. The transition duct of claim 5, further comprising a second exhaust mouth positioned in the second sidewall forming the first transition duct and extending from the downstream end of the transition duct body toward the throat, wherein an upper edge of the second exhaust mouth is substantially coplanar with an inner surface of a second sidewall forming the transition duct body.

7. The transition duct of claim 6, further comprising a sealing flange extending outward from an outer surface of the second sidewall and aligned with a lower edge forming the second exhaust mouth.

8. The transition duct of claim 7, wherein the sealing flange is offset from the second exhaust mouth such that a portion of the outer surface of the second sidewall is exposed between the second exhaust mouth and the sealing flange.

9. The transition duct of claim 5, further comprising a sealing flange extending outward from an upper surface of the transition duct body and aligned with an upper edge forming the second exhaust mouth.

10. The transition duct of claim 6, wherein the bottom edge of the first exhaust mouth is generally flush with an inner surface forming the internal passage of the transition duct body, the upper edge of the second exhaust mouth is generally flush with the inner surface forming the internal passage of the transition duct body, the upper edge of the first exhaust mouth is positioned at an acute angle relative to the bottom edge of the first exhaust mouth such that the bottom edge of the first exhaust mouth mates with an edge of the second transition duct, and a lower edge of the second exhaust mouth is positioned at an acute angle relative to the upper edge of the second exhaust mouth such that the lower edge of the second exhaust mouth mates with a lower, internal surface of the third transition duct.

11. A transition duct for routing gas flow in a combustion turbine subsystem that includes a first stage blade array having a plurality of blades extending in a radial direction from a rotor assembly for rotation in a circumferential direction, said circumferential direction having a tangential direction component, an axis of the rotor assembly defining a longitudinal direction, and at least one combustor located longitudinally upstream of the first stage blade array and located radially outboard of the first stage blade array, said transition duct, comprising:
- a transition duct body having an internal passage extending between an inlet and an outlet;
- a throat having a cross-sectional area that is less than other aspects of the transition duct body;
- wherein the outlet is offset from the inlet in the longitudinal direction;
- wherein an axis of the transition duct body is generally linear;
- wherein the outlet is configured such that a first side of the outlet of a first transition duct is coplanar with a second side of a second transition duct assembled beside the second transition duct; and
- wherein the outlet is configured such that a second side of the outlet of the first transition duct is coplanar with a first side of a third transition duct assembled beside the third transition duct that is generally opposite to the second transition duct;
- the transition duct further comprising a first exhaust mouth positioned in a sidewall and extending from a downstream end of the transition duct body toward the throat, wherein a bottom edge of the first exhaust mouth is substantially coplanar with an inner surface of a first sidewall forming the transition duct body.

12. The transition duct of claim 11, further comprising a sealing flange extending outward from an outer surface of the first sidewall and aligned with an upper edge forming the first exhaust mouth and a sealing flange extending outward from a bottom surface of the transition duct body and aligned with a lower edge forming the first exhaust mouth.

13. The transition duct of claim 11, further comprising a second exhaust mouth positioned in a second sidewall forming the first transition duct and extending from the downstream end of the transition duct body toward the throat, wherein an upper edge of the second exhaust mouth is substantially coplanar with an inner surface of the second sidewall forming the transition duct body.

14. The transition duct of claim 13, further comprising a sealing flange extending outward from an outer surface of the first sidewall and aligned with a lower edge forming the second exhaust mouth and a sealing flange extending outward from an upper surface of the transition duct body and aligned with an upper edge forming the second exhaust mouth.

15. The transition duct of claim 13, wherein the bottom edge of the first exhaust mouth is generally flush with an inner surface forming the internal passage of the transition duct body, the upper edge of the second exhaust mouth is generally flush with the inner surface forming the internal passage of the transition duct body, an upper edge of the first exhaust mouth is positioned at an acute angle relative to the bottom edge of the first exhaust mouth such that the bottom edge of the first exhaust mouth mates with a bottom, internal surface of the second transition duct, and a lower edge of the second exhaust mouth is positioned at an acute angle relative to the upper edge of the second exhaust mouth such that the upper edge of the second exhaust mouth mates with an upper, internal surface of the second transition duct.

16. A transition duct for routing gas flow in a combustion turbine subsystem that includes a first stage blade array having a plurality of blades extending in a radial direction from a rotor assembly for rotation in a circumferential direction, said circumferential direction having a tangential direction component, an axis of the rotor assembly defining a longitudinal direction, and at least one combustor located longitudinally upstream of the first stage blade array and located radially outboard of the first stage blade array, said transition duct, comprising:

a transition duct body having an internal passage extending between an inlet and an outlet;

a throat having a cross-sectional area that is less than other aspects of the transition duct body;

wherein the outlet is offset from the inlet in the longitudinal direction;

wherein an axis of the transition duct body is generally linear;

wherein the outlet is configured such that a first side of the outlet of a first transition duct is coplanar with a second side of a second transition duct assembled beside the second transition duct;

wherein the outlet is configured such that a second side of the outlet of the first transition duct is coplanar with a first side of a third transition duct assembled beside the third transition duct that is generally opposite to the second transition duct;

a first exhaust mouth positioned in a sidewall and extending from a downstream end of the transition duct body toward the throat, wherein a bottom edge of the first exhaust mouth is substantially coplanar with an inner surface of a first sidewall forming the transition duct body; and a second exhaust mouth positioned in a second sidewall forming the first transition duct and extending from the downstream end of the transition duct body toward the throat, wherein an upper edge of the second exhaust mouth is substantially coplanar with an inner surface of the second sidewall forming the transition duct body.

17. The transition duct of claim 16, further comprising a sealing flange extending outward from an outer surface of the first sidewall and aligned with an upper edge forming the first exhaust mouth and a sealing flange extending outward from a bottom surface of the transition duct body and aligned with a lower edge forming the first exhaust mouth and further comprising a sealing flange extending outward from an outer surface of the first sidewall and aligned with a lower edge forming the second exhaust mouth and a sealing flange extending outward from an upper surface of the transition duct body and aligned with an upper edge forming the second exhaust mouth.

18. The transition duct of claim 16, wherein the bottom edge of the first exhaust mouth is generally flush with an inner surface forming the internal passage of the transition duct body, the upper edge of the second exhaust mouth is generally flush with the inner surface forming the internal passage of the transition duct body, the upper edge of the first exhaust mouth is positioned at an acute angle relative to the bottom edge of the first exhaust mouth such that the bottom edge of the first exhaust mouth mates with a bottom, internal surface of the second transition duct, and a lower edge of the second exhaust mouth is positioned at an acute angle relative to the upper edge of the second exhaust mouth such that the upper edge of the second exhaust mouth mates with an upper, internal surface of the second transition duct.

* * * * *